March 8, 1949.   E. K. RALSTON   2,464,152
TENSION INDICATING MEANS
Filed Sept. 11, 1943
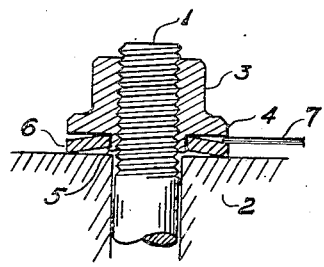
Fig. 1
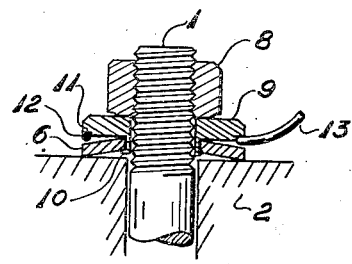
Fig. 2
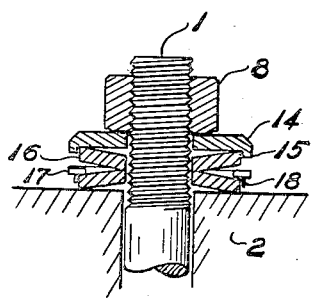
Fig. 3
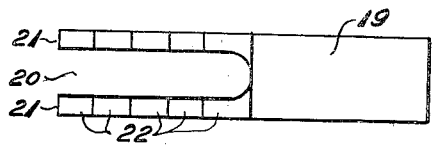
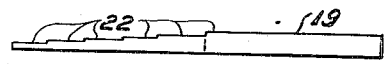
Fig. 4
Fig. 5
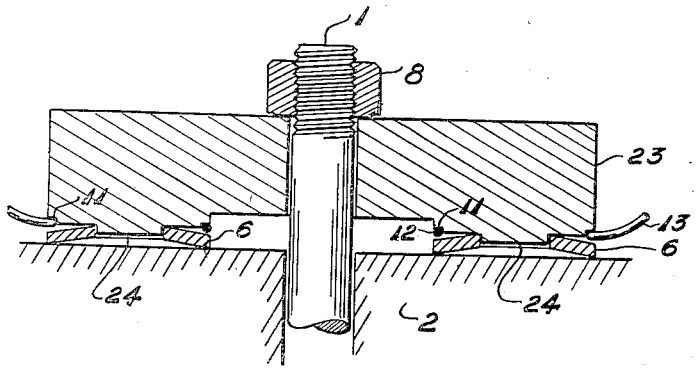
Fig. 6
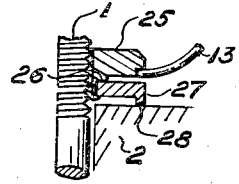
Fig. 7
Eldon Kipp Ralston
INVENTOR Patented Mar. 8, 1949

2,464,152

UNITED STATES PATENT OFFICE 2,464,152

TENSION INDICATING MEANS

Eldon Kipp Ralston, Cleveland Heights, Ohio

Application September 11, 1943, Serial No. 501,961

11 Claims. (Cl. 73—141)

My invention relates, in general, to a spring washer arrangement or assembly, and to means associated therewith for indicating a predetermined tension in a bolt or the compressive force of a nut.

When a nut and bolt are used to hold or clamp two parts together, it is desirable in many cases to know the tension produced in the bolt or the compressive force of the nut when the nut is tightened. This is especially true for bolts which are subjected to loads of considerable magnitude, or where the load varies during the operating cycle of a machine, or where there is a gasket between the parts clamped together by the bolt and nut. Internal combustion engine cylinder head bolts are typical examples of a combination of the above conditions.

Considering the case of a bolt and nut which are subjected to a variable load of considerable magnitude, if the nut is too loose and sufficient original tension has not been developed in the bolt, the nut may unscrew and the parts clamped together may separate when the load increases during the operating cycle of the machine. Conversely if the nut is too tight and too high a tension has been developed in the bolt, it may fail due to fatigue caused by the high variable stresses produced when the variable external load is combined with the initial high tension.

This problem of proper bolt tension has been partially solved in the past by the development of so-called "Torque" wrenches which measure the torque required to tighten a nut. The actual tension produced in the bolt, however, is only roughly proportional to the torque required to tighten the nut. This is due to variations of the extreme pressure qualities of the lubricant used, the roughness of the threads, and the amount of dirt on the threads. I have found, for example, that the torque required to tighten the same nut and bolt, under the same load, will vary at least twenty five per cent and considerably more than this if the threads are scuffed or the lubricant changed. Obviously, therefore, the use of a "torque" wrench is not a sufficiently accurate method of indicating bolt tensions for modern machinery.

One object of my invention is to provide simple and effective means for accurately determining the tension produced in a bolt or the compressive force exerted by a nut.

Another object of my invention is to provide means for indicating the tension produced in a bolt which is a part of the bolt installation, and which does not require the use of special tools or wrenches to determine the aforementioned tension.

Still another object of my invention is to provide a compact spring washer assembly or unit which advantageously may have associated therewith means for indicating a predetermined deflection of the washer and therefore the load applied thereto.

A further object of my invention is to provide means for increasing the resilience or elasticity of a bolt, which means will sustain the same load as the bolt and yet will not materially increase the weight, size or space required for the bolt and nut assembly. The numerous advantages of this increased bolt resilience may best be illustrated by the following examples:

Consider first the simple tightening operation to a ½ inch steel bolt and nut clamping parts 2 inches thick together and assume that the parts have a resilience of one-fifth that of the bolt. After the nut is initially tightened, a one-eighth additional turn of the nut would increase the stress in the bolt 120,000 pounds per square inch, if no plastic deformation took place. I have found, however, that if this is done the threads are partially stripped, thus weakening the bolt assembly. However, if a compression washer of the proper size, as described hereinafter, is used, a one-eighth additional turn of the nut would increase the stress in the bolt only 23,000 pounds per square inch and no plastic deformation or stripping of the threads would take place. This illustrates the well-known fact that when tightening a nut it is very difficult to tell how far to turn the nut, inasmuch as after the proper position has been reached a small additional fraction of a turn will increase the stress in the bolt a very undesirable amount and may partially strip the threads. I have found that this critical tightening can be eliminated by the use of the compression washer arrangement comprising my invention. This is due to the fact that a small fraction of a turn of the nut increases the stress in the bolt only a small amount, as previously described, and therefore the exact position to which the nut is turned is not as critical.

Next consider the case of a ½ inch steel bolt and nut clamping a pair of aluminium flanges together and assume that the temperature of both the bolt and the flanges is raised 200° F. With a standard bolt and nut the total load in the bolt would be increased 6,500 pounds. With the use of a compression washer, as described hereinafter, the total load would be increased only 265 pounds. This again is due to the additional resilience afforded by the spring washer element.

Finally consider the case of a bolt subjected to a shock or impact load. In such cases it is a well-known fact that to interpose a spring or resilient member between the member imparting the shock load and the member receiving it reduces the magnitude of the stress produced in the bolt. Again considering the case of a ½ inch bolt 2 inches long, the resilience or elasticity of the proper size compression washer for this size bolt would be approximately one hundred times that of the bolt itself, and consequently the use of such a compression washer with the bolt would reduce, in porportion, the stress produced in the bolt by a shock load.

These are the principal objects and advantages of my invention. However, further objects and advantages of my invention will appear from the following description of several embodiments thereof and from the accompanying drawing in which:

Fig. 1 is a longitudinal section through a bolt provided with a compression washer arrangement according to the invention; Figs. 2 and 3 are sectional views illustrating two different modifications of the invention; Figs. 4 and 5 are plan and side elevation views, respectively, of an indicator gage for use with the compression washer arrangement according to the invention; Fig. 6 is a section showing another modification and illustrating the invention and applied to a clamping bar; and Fig. 7 is a fragmentary section illustrating still another modification of the invention.

Referring to Fig. 1, a bolt 1, holding or clamping the part 2, has a nut 3 screwed onto its threaded end. The said nut is flanged laterally outward adjacent its bearing face 4 to thereby enlarge the bearing area of said face 4. A short cylindrical extension or lip 5, bordering the threaded opening of the nut, projects from the bearing face 4. The said face 4 of the nut 3 bears against the upper edge of the circular aperture in a conical or dished spring washer 6, commonly known as a Belleville spring, and the cylindrical extension 5 projects through and is loosely received within the said aperture. The end or rim of the cylindrical extension 5 is preferably flared or flanged outwardly around the lower edge of the aperture in the washer 6 in order to hold the said washer to the nut 3. This provides an assembly unit which is more convenient in many cases, although it is not necessary for the proper operation of the assembly.

The dished spring washer 6 is preferably made of a good quality material, such as an alloy spring steel which can be heat treated to produce high physical strength. Such a washer can then be completely flattened without causing any permanent deformation or set therein. I prefer to use an angle of from 5 to 15 degrees for the conical sides of the washer and an outside diameter therefor of from one and one-half to six times that of the bolt 1. The thickness of the washer is determined by the load to be carried; the greater the thickness, the more load the washer will carry for the same deflection.

In operation, the specially shaped nut 3 is used just the same as a standard nut, and may be tightened on the bolt 1 with any ordinary wrench or tool. Upon being tightened, the nut 3 functions as a force-imparting member to apply the load to the conical spring washer 6. The spring washer 6 attached to the nut is made of the proper proportions to carry the load of the particular size bolt on which it is being used, and to give a suitable deflection under the working load. The deflection constant of the spring washer 6 is readily ascertainable and may be conveniently designated in pounds per .001 inch deflection, and is preferably marked on the washer or nut. Then, when tightening the nut 3 on the bolt 1, it is only necessary to turn the nut until the space between the outer edges of the washer 6 and the bearing face 4 of the nut decreases to a certain prescribed distance. This predetermined space may be conveniently measured by a feeler gage 7 or any other type of thickness gage inserted between the outer edges of the washer 6 and the bearing face 4 of the nut 3. The said predetermined space between the nut and washer is equal to the original space therebetween (i. e., the space which exists when the spring washer is under no compression and which is standard and known for any particular unit) minus the deflection of the spring washer; and inasmuch as .001 inch deflection represents a certain load increment on the bolt, the total load may therefore be readily determined.

In the modification shown in Fig. 2, the bolt 1 clamping the part 2 is provided with a standard type nut 8. Interposed between the nut 8 and the conical spring washer 6 is a flat indicator washer or collar 9 which rests or bears against the upper edge of the aperture in the spring washer 6 and transmits the load thereto from the nut. The indicator collar 9 thus functions as a force imparting member for applying the load to the spring washer 6. As in the case of the nut 3 in Fig. 1, the indicator collar 9 is preferably provided with a short cylindrical extension or lip 10 which fits loosely within the circular aperture in the spring washer 6 and which has its end or rim portion flared or flanged outwardly around the lower edge of the said aperture to thereby hold the spring washer loosely to the indicator collar 9. While such attachment of the spring washer 6 to the indicator collar 9 is not necessary, I have nevertheless found it to be desirable in order to prevent the inner edge of the spring washer 6 from engaging with the threads of the bolt, and also to provide a unitary assembly.

The indicator collar 9 may be provided with a peripheral groove 11 in its washer engaging or bearing face for receiving and centering a ring-shaped feeler gage or indicator ring 12, preferably formed of wire. The indicator ring 12 is preferably of circular form having a radius slightly larger than that of the groove 11 so that it may be freely rotated in the groove. In addition, the ring 12 is preferably split or open so that it can be contracted a slight amount. The ends of the wire ring 12, where the said ring is split, are turned or bent outwardly, as indicated at 13, to provide a convenient finger grip.

In operation, the nut 8, when tightened in the usual manner on the bolt 1, pressesr against the indicator collar 9 which in turn presses against the upper edge of the aperture in the spring washer 6, thus compressing the latter. As the spring washer flattens, the space between the outer edge portion of the said washer and the facing wall portion of the groove 11, within which space the indicator ring 12 is confined, decreases until the indicator ring engages the said portions of the washer and collar. If, during this time, the ends 13 of the indicator ring 12 are held in one's fingers and the ring rotated or oscillated within the groove 11, it is easy to ascertain when such engagement takes place inasmuch as binding of the ring between the washer 6 and collar 9 then occurs. The ends 13 of the ring 12 are then released, and it being a split or open ring, it will spring apart slightly and thus will not thereafter transmit any load from the collar 9 to the spring washer 6. The use of such an indicator ring 12 in the above described manner thus provides a simple and accurate method of indicating when a predetermined deflection of the spring washer has taken place, and consequently when a predetermined load has been applied to the bolt.

The use of multiple spring washers is shown in Fig. 3 wherein the part 2 is clamped by the bolt 1 and the standard nut 8. The nut 8 transmits the load to a centering washer or collar 14 which bears against the outer peripheral edge of a conical spring washer 16. The collar or cap 14 is preferably provided with a circular or peripheral lip 15 which fits over the outside diameter of the spring washer 16 to center the said collar and spring washer. In Fig. 3, the spring washer 16 is shown as consisting of two single conical spring washers, such as illustrated in Figs. 1 and 2, welded together along the surfaces bordering the central apertures therein. Such a welded joining of the two spring washers can be accomplished either by inserting a small ring between the inner peripheral edges of the washers before welding, or by providing one of the washers with a cylindrical extension around the central aperture therein, which extension bears against the other washer, and projection welding the two spring washers together. In a like manner, more than two conical spring washers can be welded together, the first pair along the edges of their center apertures, then the next washer along the outer peripheral edges, then the next one along the edges of the center apertures again, and continued in this manner until the proper number of spring washers are assembled to give the total resilience or elasticity required.

In operation, the nut 8 presses against the centering washer or collar 14 which trasmits the load, in turn, to the multiple spring washer 16, flattening each individual washer element thereof a like amount. For a multiple spring washer of this type, I prefer to provide a deflection indicator device consisting of a radially corrugated ring 17 made of thin material and provided with several tabs 18 which are bent down to fit over the outer peripheral edge of one of the spring washers and thus center the ring relative to the washers. If the indicator ring 17 is rotated during the tightening of the nut 8, it will be easy to tell when the space between the adjacent outer edges of two adjacent washer elements decreases to the thickness of the indicator ring 17, inasmuch as the ring will then bind. This will indicate that the washers have been deflected a predetermined amount and correspondingly that a predetermined load has been applied to the bolt 1. The indicator ring 17, being corrugated, has little compressive strength in the direction of application of the load and therefore will not transmit any appreciable load between the two outer edges of the spring washers.

Figs. 4 and 5 are plan and side views, respectively, of a thickness gage which may be used to measure the deflections of the spring washers shown in the drawings. Such a thickness gage may be used in place of the feeler gage 7 in Fig. 1, the wire ring 12 in Figs. 2, 6 and 7, and the corrugated ring 17 in Fig. 3. This thickness gage, as will be seen, is a separate tool not attached to or forming a part of the washer-nut unit, and the gage shown in Figs. 4 and 5 illustrates one type thereof for general use with nuts and washers of a given size.

The said thickness gage comprises a rectangular plate-shaped body portion 19 having a slot 20 extending inwardly from one end thereof to provide spaced arms or side portions 21. The slot 20 permits the insertion of the gage arms 21 in the gaging space between the spring washer 6 and the nut or collar or other force-applying member bearing against the washer. The gage arms 21 are preferably provided with steps 22 of different thicknesses. These steps enable the setting of the spring washers at several different deflections and likewise facilitate the use of this type of gage in checking the deflections of spring washers already set.

Fig. 6 illustrates the application of conical spring washers to a clamping bar 23. The bolt 1, clamping the part 2, projects through a bolt hole in the clamping bar 23. The nut 8, threaded on the projecting end of the bolt 1, presses against the clamping bar 23 which transmits the load to one or more conical spring washers 6 interposed between the said clamping bar and the part 2. The clamping bar 23 is preferably provided with centering projections or bosses 24 which fit loosely into the central apertures in the spring washers 6 to center or position the same relative to the clamping bar. Also, wire indicator rings 12 of the type shown in Fig. 2 are preferably employed, the said indicator rings being received and retained within annular grooves 11 in the clamping bar 23. It will be seen that the operation of the spring washers 6 and the indicator rings 12 in Fig. 6 will be the same as in Fig. 2 and that the clamping bar 23 replaces the indicator collar 9, the said bar serving as a force-imparting member to apply the load over several spring washers instead of one. This modification of the invention thus illustrates the use of compression washers in positions other than under a nut or bolt head. I have found such use entirely practical and feasible for applications where for structural or other reasons it is desirable to locate the washers and indicators remote from the nut or bolt head.

In the modification shown in Fig. 7, the bolt 1, clamping the part 2, has a nut (not shown) threaded on its projecting end. The said nut presses against an indicating washer or collar 25 having a stepped cylindrical extension 26 the shoulder portion of which rests or bears against and transmits the load to the inner edge of a dished spring washer 27. The indicator collar 25 is preferably provided with a peripheral groove, in that surface thereof facing the spring washer, for receiving and centering an indicator ring such as shown in Fig. 2 and having outwardly turned ends 13. As shown, the cylindrical extension 26 on the collar 25 projects through the central aperture in the spring washer 27 and has its end or rim portion peaned or flared outwardly around the lower edge of the said aperture to thereby hold the spring washer loosely to the indicator collar. The spring washer 27, as shown here, is substantially flat and is provided with a cylindrical extension or lip 28 around its periphery which bears against and transmits the load to the part 2. With a washer of this type, a load applied to the washer causes it to be dished downwardly, but the deflection takes place in a like manner to that of the conical spring washer previously described in connection with Figs. 1–3, and the deflection may be measured the same way. The washer 27 illustrates another type of spring washer that has been found to be equally satisfactory, from a performance standpoint, to the conical type as previously described. Other variations or combinations of these types of dished spring washers will also work satisfactorily, but the conical type of spring washer is preferably used wherever possible for the reason that it is more economical to manufacture and easier to manufacture accurately.

While I have illustrated and described in detail several forms of the invention, it will be apparent to those skilled in the art that various modifications may be made without departing from the spirit of the invention or the scope of the appended claims.

I claim:

1. A compression washer arrangement comprising a dished spring washer member, a force-applying member having a bearing surface facing and normally spaced from the outwardly dished surface of the washer member and bearing against the edge of the aperture therein, and indicator means mounted on one of said members and engaging with both said members upon a predetermined amount of deflection of the washer member to thereby indicate when the washer member has been deflected the said predetermined amount.

2. A compression washer arrangement comprising a dished spring washer member, a force-applying member having a bearing surface facing and normally spaced from the outwardly dished surface of the washer member and bearing against the edge of the aperture therein, and feeler gage means movably mounted on one of said members and arranged to be clamped between the said surfaces of said members upon deflection of the washer member to thereby indicate a predetermined deflection of the washer member.

3. A compression washer arrangement comprising a dished spring washer member, a force-applying member having a bearing surface facing and normally spaced from the outwardly dished surface of the washer member and bearing against the edge of the aperture therein, and an indicator ring rotatably mounted on one of said members for rotation about the axis of the washer member, said ring being arranged to be clamped between the said surfaces of said members upon deflection of the washer member to thereby indicate a predetermined deflection of the said washer member.

4. A compression washer arrangement comprising a dished spring washer member, a force-applying member having a bearing surface facing and normally spaced from the outwardly dished surface of the washer member and bearing against the edge of the aperture therein, said bearing surface having an annular groove facing the outer portion of the said washer surface and concentric with the washer member, and an indicator ring rotatable within the said groove and engageable with the said surfaces of said members upon deflection of the washer member to thereby indicate a predetermined deflection of the washer member.

5. A compression washer arrangement comprising a dished spring washer member, a force-applying member having a bearing surface facing and normally spaced from the outwardly dished surface of the washer member and bearing against the edge of the aperture therein, said bearing surface having an annular groove facing the outer portion of the said washer surface and concentric with the washer member, and an indicator ring freely rotatable within the said groove and engageable with the said surfaces of said members upon deflection of the washer member to thereby indicate a predetermined deflection of the washer member, said indicator ring being of slightly larger diameter than the said groove and being spring-contractible into a deflection-indicating position against the wall of said groove.

6. A compression washer device comprising a dished spring washer, a force-applying member facing the outwardly dished surface of the washer member and having a bearing surface normally spaced from the said surface of the washer member and bearing against the edge of the aperture therein, said force-applying member being secured to the washer member adjacent the said aperture edge, and feeler gage means movably mounted on one of said members and positioned between and engageable with the said surfaces of said members upon deflection of the washer member to thereby indicate a predetermined deflection of the washer member.

7. A compression washer device comprising a dished spring washer, a force-applying member facing the outwardly dished surface of the washer member and having a bearing surface normally spaced from the said surface of the washer member and bearing against the edge of the aperture therein, said force-applying member being secured to the washer member adjacent the said aperture edge, and a feeler gage ring rotatably mounted on one of said members for rotation about the axis of said washer member, said ring being positioned between and engageable with the said surfaces of said members upon deflection of the washer member to thereby indicate a predetermined deflection of the washer member.

8. A compression washer device comprising a dished spring washer, a force-applying member facing the outwardly dished surface of the washer member and having a bearing surface normally spaced from the said surface of the washer member and bearing against the edge of the aperture therein, said force-applying member being secured to the washer member adjacent the said aperture edge, and a feeler gage ring rotatably mounted on one of said members for rotation about the axis of said washer member, said ring being provided with finger grip means to enable rotation thereof and being disposed between the said surfaces of said members in position to be engaged by said surfaces upon deflection of the washer member.

9. A compression washer device comprising a dished spring washer, a force-applying member facing the outwardly dished surface of the washer member and having a bearing surface normally spaced from the said surface of the washer member and bearing against the edge of the aperture therein, said force-applying member being secured to the washer member adjacent the said aperture edge and having its said bearing surface provided with an annular groove facing the outer portion of the said washer surface and concentric with the washer member, and a feeler gage ring rotatably mounted within the said groove and engageable with the said surfaces of said members upon deflection of the washer member to thereby indicate a predetermined deflection of the washer member.

10. A compression washer device comprising a dished spring washer, an aligned collar facing the outwardly dished surface of and substantially corresponding in diameter to the washer and having a substantially flat bearing surface bearing against the edge of the aperture in the washer, said collar being secured to the washer adjacent the said aperture edge and having its said bearing surface provided with a peripheral groove, and a feeler gage ring rotatably mounted within the said groove and engageable with the said surfaces of the washer and collar upon deflection of the washer to thereby indicate a predetermined deflection of the washer.

11. A compression washer device comprising a dished spring washer, an aligned collar facing the outwardly dished surface of and substantially corresponding in diameter to the washer and having a substantially flat bearing surface bearing against the edge of the aperture in the washer, said collar being secured to the washer adjacent the said aperture edge and having its said bearing surface provided with a peripheral groove, and a feeler gage ring rotatably mounted within the said groove and engageable with the said surfaces of the washer and collar upon deflection of the washer to thereby indicate a predetermined deflection of the washer, said ring being of slightly larger diameter than the said groove and being spring-contractible into a deflection-indicating position against the wall of said groove.

ELDON KIPP RALSTON.

REFERENCES CITED

The following references are of record in the file of this patent:

UNITED STATES PATENTS

| Number | Name | Date |
| --- | --- | --- |
| 697,701 | Ayer | Apr. 15, 1902 |
| 1,020,748 | Dobson | Mar. 19, 1912 |
| 1,945,005 | Vacher | Jan. 30, 1934 |
| 1,998,450 | Davis | Apr. 23, 1935 |
| 2,188,356 | Jeans et al. | Jan. 30, 1940 |
| 2,330,102 | Yarnall | Sept. 21, 1943 |

FOREIGN PATENTS

| Number | Country | Date |
| --- | --- | --- |
| 397,701 | Great Britain | Aug. 31, 1933 |
| 827,850 | France | Feb. 2, 1938 |
| 837,051 | France | Nov. 3, 1928 |